United States Patent
Rhodes et al.

(10) Patent No.: US 11,285,832 B2
(45) Date of Patent: Mar. 29, 2022

(54) HEAT EXCHANGER FOR A POWER CONNECTOR

(71) Applicant: TE CONNECTIVITY CORPORATION, Berwyn, PA (US)

(72) Inventors: Clara Marguerite Rhodes, Winston-Salem, NC (US); Aaron James de Chazal, Rochester, MI (US); Nathan Philip Myer, Lancaster, PA (US); Jeremy Christin Patterson, Winston-Salem, NC (US); Kevin John Peterson, Kernersville, NC (US); David Bruce Sarraf, Elizabethtown, PA (US)

(73) Assignee: TE Connectivity Services GmbH

( * ) Notice: Subject to any disclaimer, the term of this patent is extended or adjusted under 35 U.S.C. 154(b) by 0 days.

(21) Appl. No.: 16/877,658

(22) Filed: May 19, 2020

(65) Prior Publication Data
US 2020/0384875 A1   Dec. 10, 2020

Related U.S. Application Data

(60) Provisional application No. 62/857,641, filed on Jun. 5, 2019.

(51) Int. Cl.
| | |
|---|---|
| *H01R 13/00* | (2006.01) |
| *B60L 53/302* | (2019.01) |
| *F28D 7/06* | (2006.01) |
| *B60L 53/16* | (2019.01) |
| *H01R 13/502* | (2006.01) |

(52) U.S. Cl.
CPC ............. *B60L 53/302* (2019.02); *B60L 53/16* (2019.02); *F28D 7/06* (2013.01); *H01R 13/502* (2013.01)

(58) Field of Classification Search
CPC .. H01R 13/005; H01R 24/66; H01R 2201/26; H01R 13/533; H01R 13/502; Y02T 10/7005; Y02T 10/7072; Y02T 90/14; Y02T 90/12; Y02T 10/70; F28D 7/06;
(Continued)

(56) References Cited

U.S. PATENT DOCUMENTS

| | | | |
|---|---|---|---|
| 10,618,418 B2* | 4/2020 | Turik | B60L 53/18 |
| 10,644,422 B2* | 5/2020 | Moseke | H01R 13/533 |

(Continued)

FOREIGN PATENT DOCUMENTS

| | | |
|---|---|---|
| CN | 208754008 U | 4/2019 |
| CN | 109728459 A | 5/2019 |

(Continued)

OTHER PUBLICATIONS

International Search Report, International Application No. PCT/IB2020/054803, International Filing Date, May 20, 2020.

*Primary Examiner* — Abdullah A Riyami
*Assistant Examiner* — Nelson R. Burgos-Guntin (57) ABSTRACT

A cooling system for a power connector of a charging inlet assembly includes a cooling adapter coupled to a housing of the charging inlet assembly including an adapter body forming a cavity. The cooling adapter includes supply and return ports adjacent a cable exit. The cooling system includes a heat exchanger positioned in the cavity of the cooling adapter including a heat exchanger body configured to receive the power cable and/or the terminal. The heat exchanger body is thermally coupled to the power cable or the terminal to dissipate heat therefrom.

21 Claims, 9 Drawing Sheets

(58) Field of Classification Search
CPC .... B60L 53/11; B60L 53/302; B60L 11/1818;
B60L 53/18; B60L 53/16; B60L 2230/12
USPC .................................. 439/485, 34, 196, 660
See application file for complete search history.

(56) References Cited

U.S. PATENT DOCUMENTS

| | | | | |
|---|---|---|---|---|
| 10,756,498 | B1* | 8/2020 | Sarraf | H01R 13/50 |
| 2003/0176092 | A1* | 9/2003 | Itoh | H01R 13/6315 |
| | | | | 439/174 |
| 2006/0281352 | A1* | 12/2006 | Kabasawa | F04D 19/04 |
| | | | | 439/247 |
| 2008/0214022 | A1* | 9/2008 | Kowalick | H01R 13/6397 |
| | | | | 439/34 |
| 2009/0273310 | A1* | 11/2009 | Flack | B60L 53/302 |
| | | | | 320/107 |
| 2010/0255686 | A1* | 10/2010 | Doo | H01R 13/2421 |
| | | | | 439/34 |
| 2016/0043485 | A1* | 2/2016 | Stoermer | H01R 12/714 |
| | | | | 439/78 |
| 2016/0190718 | A1* | 6/2016 | VanZuilen | H01R 12/515 |
| | | | | 310/71 |
| 2018/0264962 | A1* | 9/2018 | Wischnack | H02J 7/0045 |
| 2019/0020140 | A1* | 1/2019 | Fuehrer | H01R 13/04 |
| 2019/0074620 | A1* | 3/2019 | Moseke | B60L 53/18 |
| 2019/0109409 | A1* | 4/2019 | Fuehrer | H01R 13/533 |
| 2020/0384875 | A1* | 12/2020 | Rhodes | B60L 53/302 |
| 2021/0021070 | A1* | 1/2021 | Cole | B60L 53/16 |
| 2021/0063097 | A1* | 3/2021 | Hitchcock | F28F 9/0253 |

FOREIGN PATENT DOCUMENTS

| | | |
|---|---|---|
| DE | 102016204895 A1 | 9/2017 |
| DE | 102016117439 A1 | 3/2018 |

* cited by examiner

HEAT EXCHANGER FOR A POWER CONNECTOR

CROSS REFERENCE TO RELATED APPLICATIONS

This application claims the benefit of U.S. Provisional Application No. 62/857,641 filed 5 Jun. 2019 titled "Charging Inlet Active Cooling with U-Tube," the subject matter of which is herein incorporated by reference in its entirety.

BACKGROUND OF THE INVENTION

The subject matter herein relates generally to heat exchangers for power connectors.

Electrical connectors, such as power connectors, generate heat when current flows through the terminals and cables of the power connectors. For example, a power connector of a charging inlet assembly for a battery system of an electric vehicle (EV) or hybrid electric vehicle (HEV) may generate heat through the terminals and the cables of the charging inlet assembly during a charging process. A charging connector is configured to be mated with the terminals of the charging inlet assembly to charge the battery system of the vehicle. It is desirable to increase the current transmitted through the terminals for charging the battery. However, at higher currents, the terminals and the power cables experience an increase in temperature, which may damage the components of the charging inlet assembly.

A need remains for a cooling system for cooling a power connector, such as for a charging inlet assembly.

BRIEF DESCRIPTION OF THE INVENTION

In embodiments herein a cooling system for a power connector of a charging inlet assembly is provided. The cooling system includes a cooling adapter configured to be coupled to a housing of the charging inlet assembly. The cooling adapter includes an adapter body forming a cavity. The adapter body has a cable exit for a power cable of the charging inlet assembly. The cooling adapter includes a supply port adjacent the cable exit and a return port adjacent the cable exit. The cooling system includes a heat exchanger positioned in the cavity of the cooling adapter. The heat exchanger includes a heat exchanger body configured to receive at least one of the power cable or a terminal extending from the power cable. The heat exchanger body is thermally coupled to the at least one of the power cable or the terminal to dissipate heat therefrom.

In another embodiment, a power connector is provided. The power connector includes a housing extending between a front and a rear. The housing has a chamber at the rear. The housing has a terminal channel between the front and the rear. The power connector includes a terminal coupled to the housing. The terminal has a mating end for mating with a charging connector. The power connector includes a power cable terminated to the terminal. The power cable includes a conductor. The power connector includes a heat exchanger positioned in the chamber. The heat exchanger includes a heat exchanger body receiving at least one of the power cable or the cable connector of the terminal. The heat exchanger body is thermally coupled to the at least one of the power cable or the terminal to dissipate heat therefrom. The heat exchanger includes a coolant tube extending from the heat exchanger body. The coolant tube is thermally coupled to the heat exchanger body. The coolant tube has a coolant channel for coolant flow through the coolant tube. The heat exchanger includes a thermally conductive separator electrically isolating the heat exchanger body from the at least one of the power cable or the terminal.

In a further embodiment, a charging inlet assembly for an electric vehicle is provided. The charging inlet assembly includes a housing extending between a front and a rear. The housing has a chamber at the rear. The housing has a power connector at the front for receiving a charging connector. The power connector includes a first terminal channel and a second terminal channel between the front and the rear. The charging inlet assembly includes a first terminal coupled to the housing. The first terminal is positioned in the first terminal channel for mating with the charging connector and is terminated to a first power cable. The charging inlet assembly includes a second terminal coupled to the housing. The second terminal is positioned in the second terminal channel for mating with the charging connector and is terminated to a second power cable. The charging inlet assembly includes a heat exchanger positioned in the chamber. The heat exchanger includes a heat exchanger body having a first thermal interface being thermally coupled to at least one of the first terminal or the first power cable and having a second thermal interface being thermally coupled to at least one of the second terminal or the second power cable. The heat exchanger includes a coolant tube extending from the heat exchanger body. The coolant tube is thermally coupled to the heat exchanger body. The coolant tube has a coolant channel for coolant flow through the coolant tube. The coolant tube includes a supply tube at a supply side of the heat exchanger and a return tube at a return side of the heat exchanger.

DETAILED DESCRIPTION OF THE INVENTION

Figure 1:
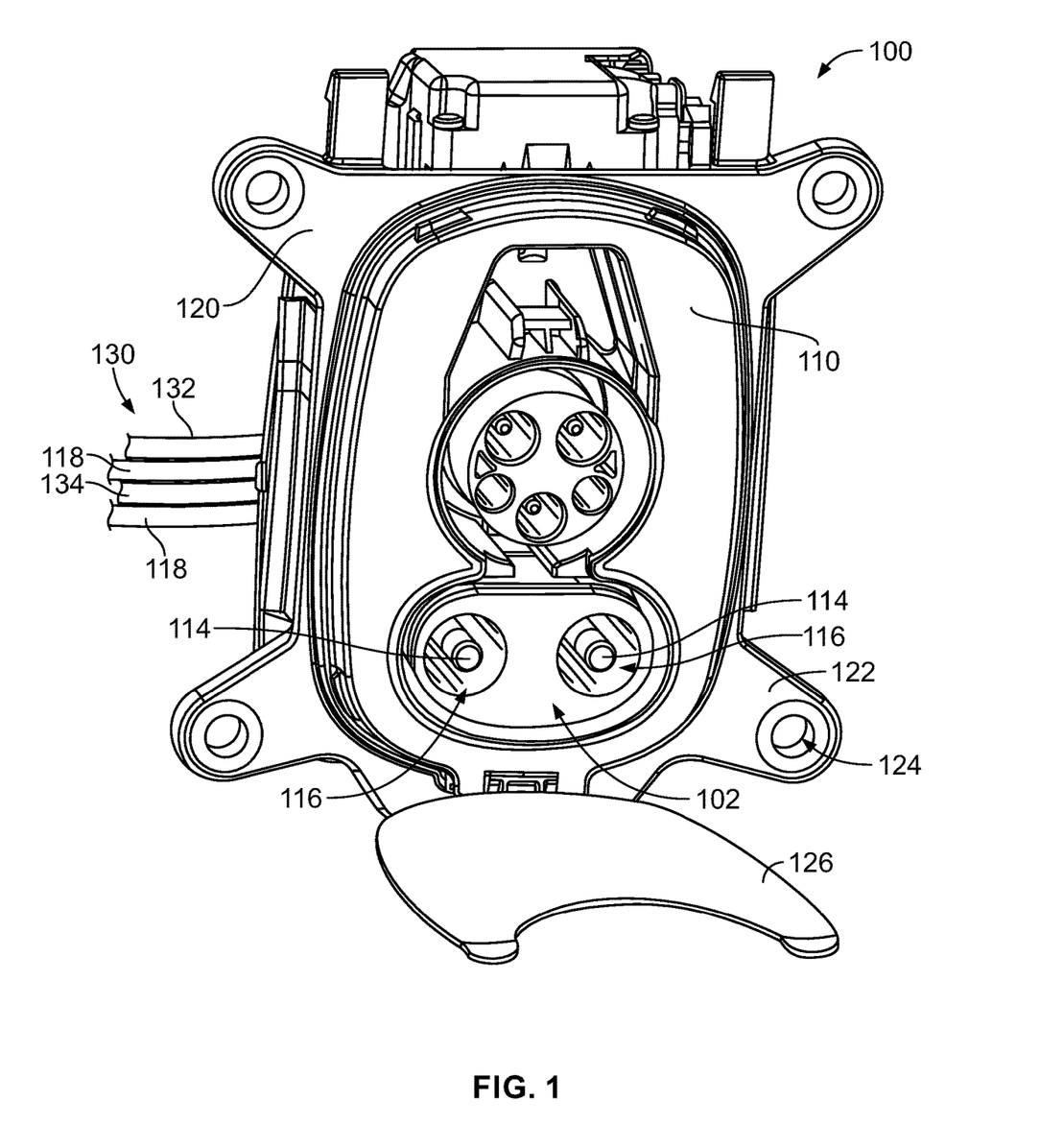
FIG. 1 is a front perspective view of a power connector of a charging inlet assembly in accordance with an exemplary embodiment.
Figure 2:
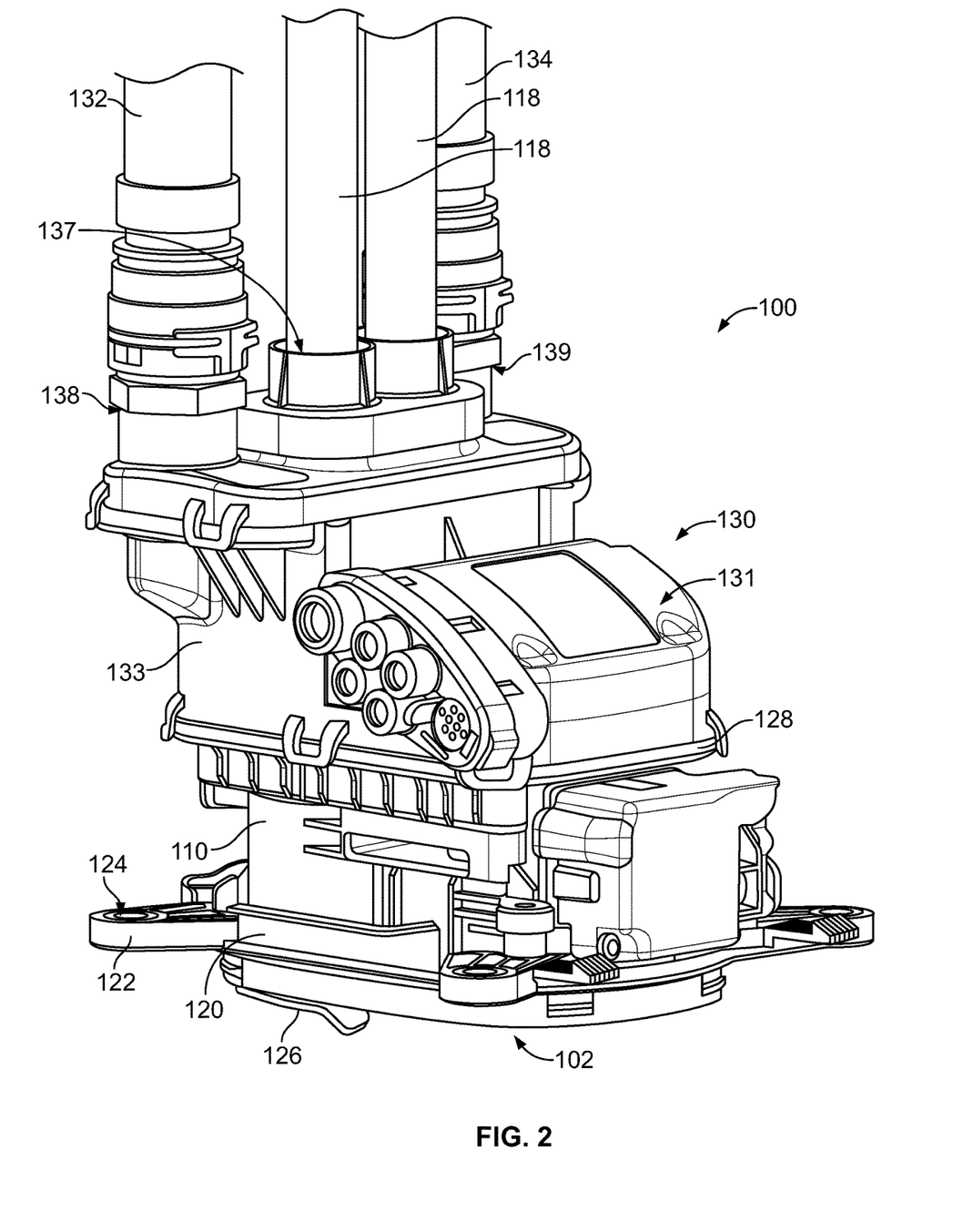
FIG. 2 is a rear perspective view of the charging inlet assembly in accordance with an exemplary embodiment.

FIG. 1 is a front perspective view of a power connector 102 of a charging inlet assembly 100 having a cooling system 130 for cooling components of the power connector 102. FIG. 2 is a rear perspective view of the charging inlet assembly 100 and cooling system 130 in accordance with an exemplary embodiment. While the power connector 102 may be described herein as part of the charging inlet assembly 100, it is realized that the power connector 102 may be another type of electrical connector, such as a stand-alone power connector or a power connector used in another device or system.

The charging inlet assembly 100 is used as a charging inlet for a vehicle, such as an electric vehicle (EV) or hybrid electric vehicle (HEV). The charging inlet assembly 100 includes a power connector 102 configured for mating reception with a charging connector (not shown). In an exemplary embodiment, the power connector 102 is configured for mating with a DC fast charging connector, such as the SAE combo CCS charging connector, in addition to AC charging connectors, such as the SAE J1772 charging connector.

The charging inlet assembly 100 includes a housing 110 holding terminals 114 forming part of the power connector 102. The terminals 114 may include DC charging terminals, AC charging terminals or other types of terminals. The terminals 114 are electrically connected to corresponding power cables 118. The terminals 114 are configured to be mated to the charging connector. The terminals 114 are received in terminal channels 116 of the housing 110. The terminals 114 may be coupled to the housing 110 in the terminal channels 116. In an exemplary embodiment, the charging inlet assembly 100 includes the cooling system 130 for actively cooling the terminals 114, such as by directly cooling the terminals and/or by cooling the power cables 118 to cool the terminals 114. Coolant may be pumped through lines or channels of the cooling system 130 and flow in thermal communication with the terminals 114 and/or the power cables 118 to dissipate heat from the terminals 114.

The charging inlet assembly 100 includes a mounting flange 120 extending from the housing 110. The mounting flange 120 is used to couple the charging inlet assembly 100 to the vehicle. The mounting flange 120 includes mounting tabs 122 having openings 124 that receive fasteners (not shown) used to secure the charging inlet assembly 100 to the vehicle. Other types of mounting features may be used to secure the charging inlet assembly 100 to the vehicle. The mounting flange 120 may include a seal to seal the charging inlet assembly 100 to the vehicle.

The charging inlet assembly 100 includes a terminal cover 126 (FIG. 1) hingedly coupled to the mounting flange 120 and/or the housing 110. The terminal cover 126 is used to cover corresponding terminals 114. The housing 110 includes a rear cover 128 (FIG. 2) at a rear of the housing 110 that closes access to the rear of the housing 110. The rear cover 128 may be clipped onto the main part of the housing 110, such as using clips or latches. Other types of securing features, such as fasteners may be used in alternative embodiments. The cooling system 130 may be integrated into the housing 110, such as passing through and/or coupled to the rear cover 128.

In an exemplary embodiment, the cooling system 130 includes a cooling adapter 131 (FIG. 2) at the rear of the housing 110. The cooling adapter 131 may be coupled to the rear cover 128 or may be defined, at least in part, by the rear cover 128. A seal may be provided at the interface between the cooling adapter 131 and the main body of the housing 110 and/or between pieces of the cooling adapter 131. For example, the cooling adapter 131 may be a multi-piece adapter. The cooling adapter 131 includes an adapter body 133 forming a cavity. The adapter body 133 forms part of the housing 110 to enclose the rear chamber of the housing 110. The cavity is open to the rear chamber of the housing 110. The cooling components of the cooling system 130 are thermally coupled to the terminals 114 and/or the power cables 118 in the cavity and/or the rear chamber of the housing 110. The adapter body 133 includes cable exits 137 for the power cables 118. The cooling adapter 131 includes a supply port 138 adjacent the cable exits 137 and a return port 139 adjacent the cable exits 137.

A coolant supply line 132 is coupled to the supply port 138 and extends from the adapter body 133 generally parallel to the power cables 118 such that the coolant supply line 132 may be bundled with the power cables 118 for controlled routing of the coolant supply line 132 and the power cables 118 from the charging inlet assembly 100, such as to the battery of the electric vehicle. A coolant return line 134 is coupled to the return port 139 and extends from the adapter body 133 generally parallel to the power cables 118 such that the coolant return line 134 may be bundled with the power cables 118 for controlled routing of the coolant return line 134 and the power cables 118 from the charging inlet assembly 100, such as to the battery of the electric vehicle. The cooling adapter 131 may include one or more interface seals (not shown) for interfacing with the coolant supply and return lines 132, 134.

In the illustrated embodiment, the supply port 138 and the return port 139 are arranged at the rear of the adapter body 133, such as adjacent the cable exits 137, such that the coolant supply line 132 and the coolant return line 134 extend from the rear (for example, parallel to the power cables 118). However, the ports 138, 139 may be at other locations. In an alternative embodiment, the supply port 138 and/or the return port 139 may be located on opposite sides of the adapter body 133.

Figure 3:
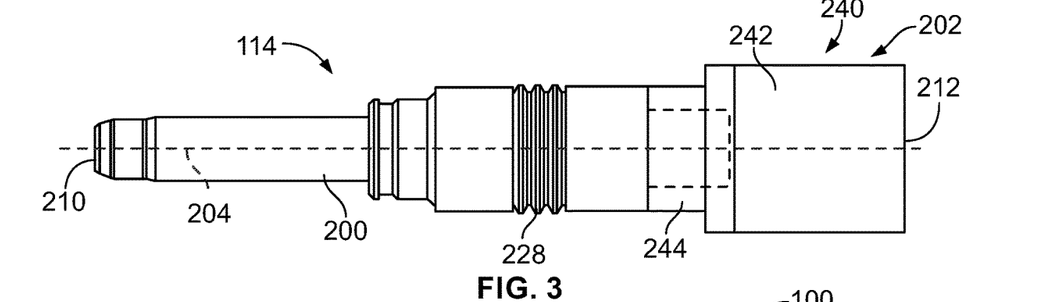
FIG. 3 is a side view of a terminal of the charging inlet assembly in accordance with an exemplary embodiment.

FIG. 3 is a side view of the terminal 114 in accordance with an exemplary embodiment. The terminal 114 includes a mating pin 200 at a front 210 of the terminal 114 and a cable connector 202 at a rear 212 of the terminal 114. The terminal 114 extends along a longitudinal axis 204. The mating pin 200 is configured to be mated to the charging connector. The cable connector 202 is configured to be electrically connected to the power cable 118 (shown in FIG. 2). In an exemplary embodiment, the mating pin 200 and/or the cable connector 202 are configured to be cooled by the cooling system 130 (shown in FIG. 2).

In various embodiments, the cable connector 202 is separate and discrete from the mating pin 200 and configured to be mechanically and electrically coupled to the mating pin 200. For example, the cable connector 202 may be press fit onto the mating pin 200. However, the cable connector 202 may be secured to the mating pin 200 by other processes in alternative embodiments, such as welding, riveting, a bolted joint, and the like. In other various embodiments, the cable connector 202 is integral with the mating pin 200, such as formed with the mating pin 200. In various embodiments, the cable connector 202 is configured to be terminated to the power cable 118 by welding the power cable 118 to the cable connector 202. For example, the cable connector 202 may include a weld tab. In other various embodiments, the cable connector 202 is terminated to the power cable 118 by other processes, such as being crimped, soldered, and the like. For example, the cable connector 202 may include a crimp barrel configured to be terminated to the power cable 118.

The mating pin 200 is electrically conductive. For example, the mating pin 200 may be manufactured from a metal material, such as a copper material. In an exemplary embodiment, the mating pin 200 is screw machined. The mating pin 200 may be manufactured from a metal alloy (for example, copper alloy) having additives to increase machinability. In an exemplary embodiment, the mating pin 200 is cylindrical. In an exemplary embodiment, a seal 228 is coupled to the mating pin 200 near a rear end of the mating pin 200 for interface sealing against an interior surface of the terminal channel 116 (shown in FIG. 1).

The cable connector 202 extends from and/or is coupled to the rear end of the mating pin 200. The cable connector 202 may be press-fit on the mating pin 200. The cable connector 202 includes a cable terminating end 240 at the rear 212 of the terminal 114. The power cable 118 is configured to be terminated to the cable terminating end 240. In the illustrated embodiment, the cable connector 202 includes a pad 242 extending from a base 244 of the cable connector 202. The pad 242 is provided at the rear 212. The pad 242 may be rectangular or have other shapes in alternative embodiments. The pad 242 may include planar, parallel surfaces for attaching the power cable 118 to the pad 242. In various embodiments, the pad 242 may be a weld pad and the power cable 118 may be a welded to the weld pad. The cable terminating end 240 may include a crimp barrel (not shown) rather than the pad 242 in alternative embodiments. The base 244 may be cylindrical and hollow to receive the rear end of the mating pin 200. The base 244 is mechanically and electrically coupled to the rear end of the mating pin 200. The base 244 may be press-fit onto the rear end of the mating pin 200.

Figure 4:
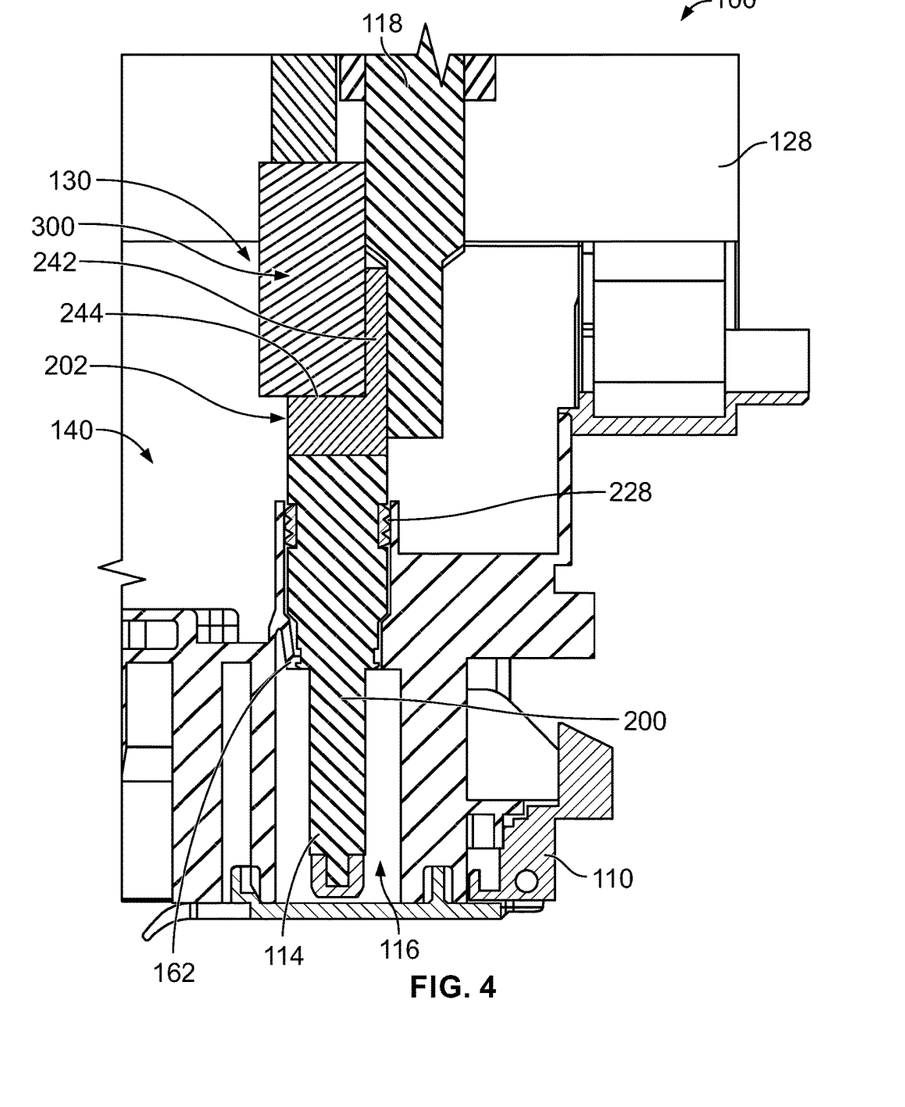
FIG. 4 is a cross-sectional view of the charging inlet assembly in accordance with an exemplary embodiment.

FIG. 4 is a cross-sectional view of the charging inlet assembly 100 in accordance with an exemplary embodiment. FIG. 4 illustrates one of the terminals 114 coupled to the housing 110. The housing 110 has a chamber 140 at the rear of the housing 110. The rear cover 128 is rearward of and closes the chamber 140. The power cables 118 and the coolant supply and return lines exit the chamber 140 through the rear cover 128 (for example, through openings or ports in the rear cover 128).

The terminal 114 extends into the chamber 140 and the power cable 118 is terminated to the terminal 114 in the chamber 140. The cooling system 130 interfaces with the power cable 118 in the chamber 140 to provide active cooling for the terminal 114. For example, the cooling system 130 includes a heat exchanger 300 positioned in the chamber 140 to interface with the terminal 114. The heat exchanger 300 is thermally coupled to the terminal 114. The cooling system 130 lowers the operating temperature of the terminal 114 to improve performance of the charging inlet assembly 100 and/or to allow higher current through the terminal 114 and/or to reduce risk of damage to the terminal 114.

The terminal 114 is received in the corresponding terminal channel 116. The mating pin 200 is located in the terminal channel 116 for interfacing with a charging connector plugged into the housing 110. The housing 110 includes a primary latch 162 extending into the terminal channel 116 to engage and axially retain the terminal 114 in the terminal channel 116. The primary latch 162 may be a deflectable latch. The primary latch 162 may be integral with the housing 110, such as co-molded with the housing 110. The primary latch 162 resists rearward pull out of the terminal 114 from the terminal channel 116. In an exemplary embodiment, the seal 228 is sealed to a surface of the housing 110 defining the terminal channel 116.

In an exemplary embodiment, the terminal 114 is located in the terminal channel 116 such that the cable connector 202 is located immediately rearward of the terminal channel 116. The cable connector 202 extends into the chamber 140 for electrical connection with the power cable 118. The power cable 118 is coupled to the pad 242 within the chamber 140. In an exemplary embodiment, the power cable 118 may be ultrasonically welded to the pad 242, creating a low resistance interface between the terminal 114 and the power cable 118. In other various embodiments, the power cable 118 may be crimped or otherwise mechanically and electrically terminated to the terminal 114. The cooling system 130 is thermally coupled to the terminal 114, such as immediately rearward of the terminal channel 116, to define a low-profile connection between the cooling system 130 and the terminal 114. In various embodiments, the heat exchanger 300 may be directly thermally coupled to the base 244 and/or the pad 242. Optionally, a thermal interface material, a thermal grease or another thermal bridge may be provided between the terminal 114 and the heat exchanger 300. In other various embodiments, the heat exchanger 300 may be indirectly thermally coupled to the terminal 114, such as through the power cable 118. For example, by dissipating heat from the power cable 118, the temperature of the terminal 114 may be reduced. The power cable 118 functions as a thermal bridge between the heat exchanger 300 and the terminal 114.

Figure 5:
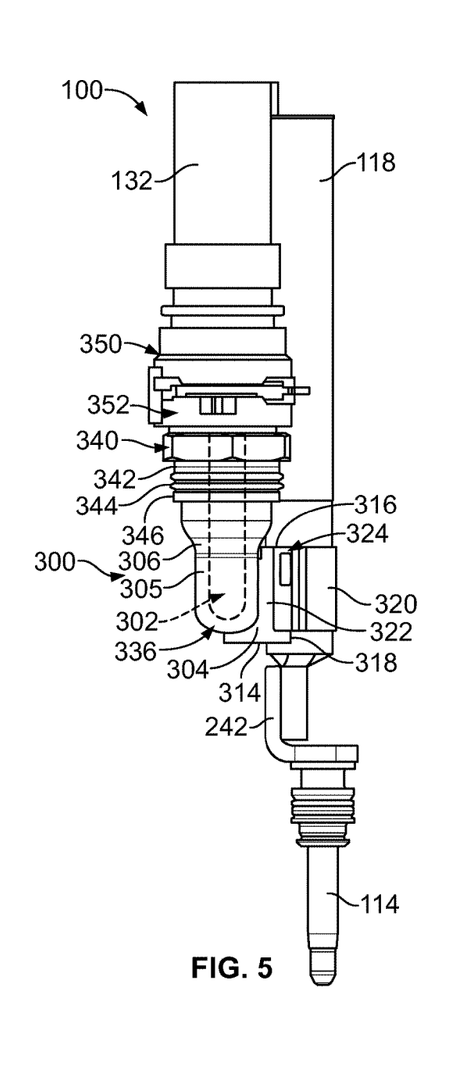
FIG. 5 is a side view of a supply side of a portion of the charging inlet assembly in accordance with an exemplary embodiment showing a heat exchanger thermally coupled to the terminal.
Figure 6:
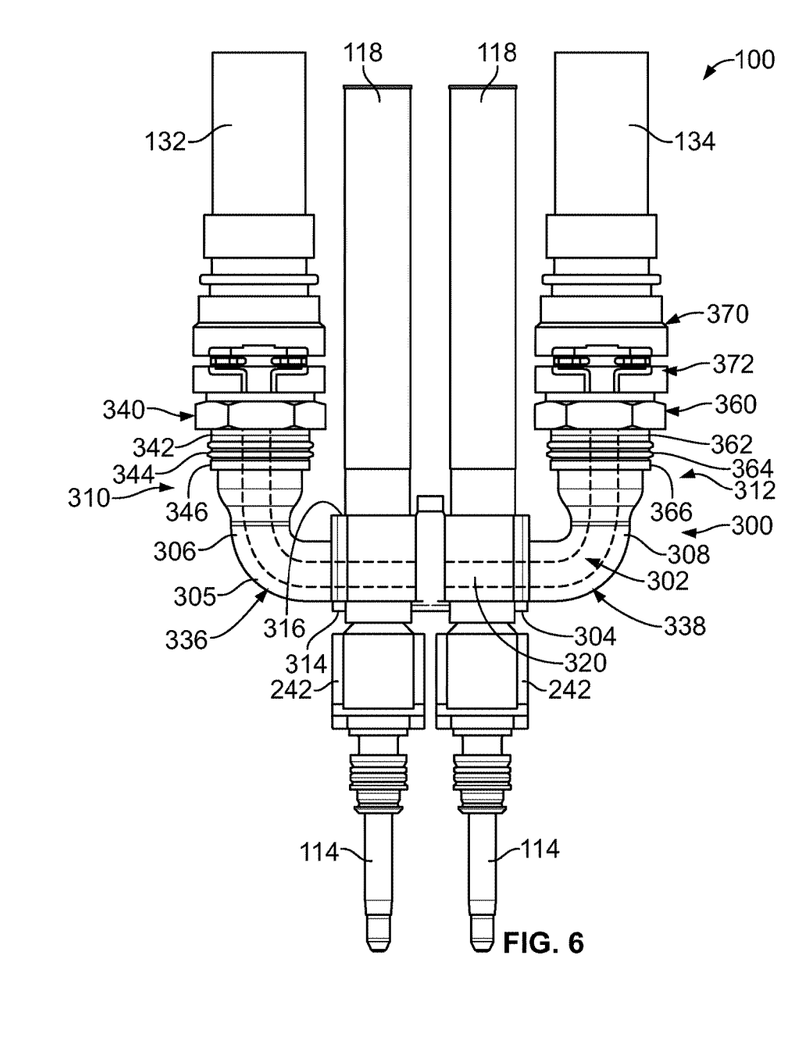
FIG. 6 is a top view of a portion of the charging inlet assembly in accordance with an exemplary embodiment showing the heat exchanger thermally coupled to the terminal.
Figure 7:
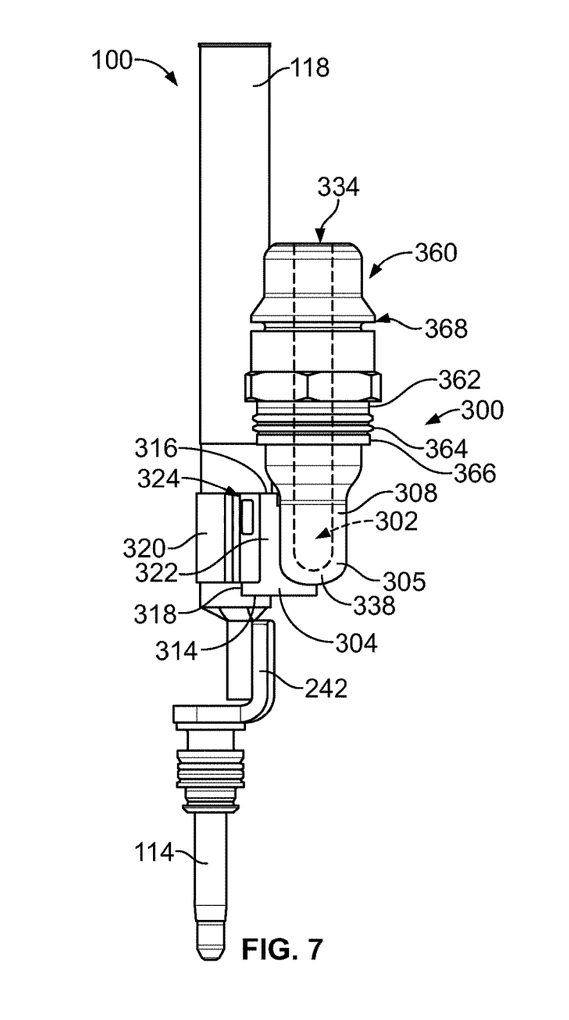
FIG. 7 is a side view of a return side of a portion of the charging inlet assembly in accordance with an exemplary embodiment showing the heat exchanger thermally coupled to the terminal.
Figure 8:
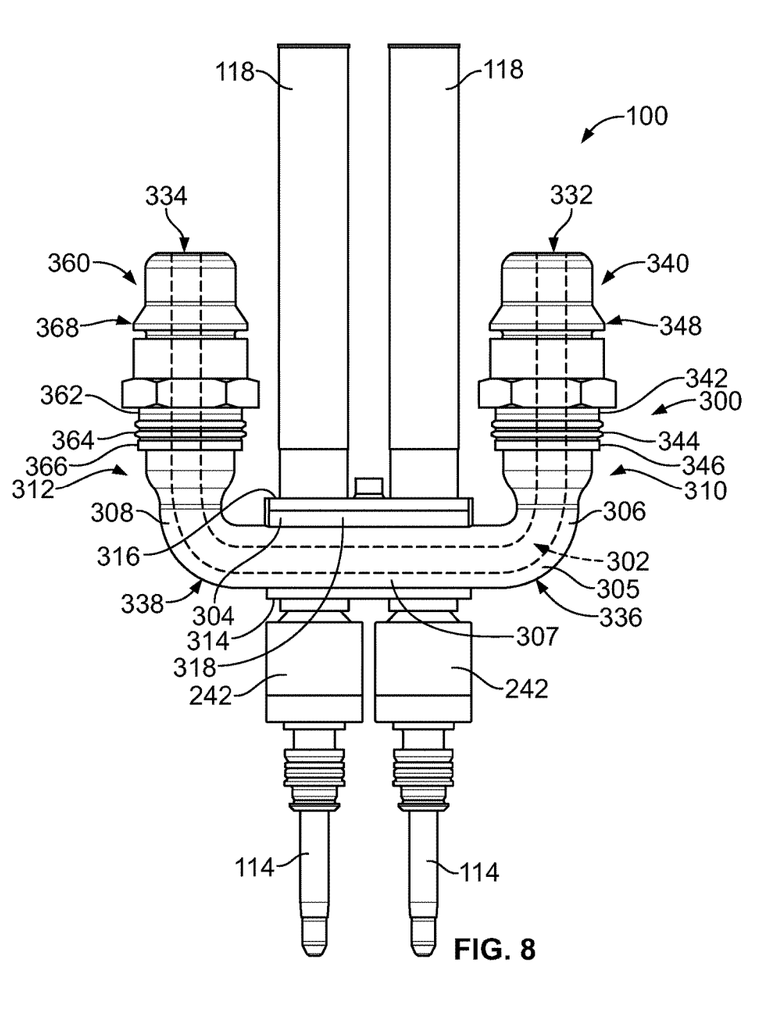
FIG. 8 is a top view of a portion of the charging inlet assembly in accordance with an exemplary embodiment showing the heat exchanger thermally coupled to the terminal.

FIG. 5 is a side view of the supply side of a portion of the charging inlet assembly 100 in accordance with an exemplary embodiment showing the heat exchanger 300 thermally coupled to the terminal 114. FIG. 6 is a top view of a portion of the charging inlet assembly 100 in accordance with an exemplary embodiment showing the heat exchanger 300 thermally coupled to the terminal 114. FIG. 7 is a side view of the return side of a portion of the charging inlet assembly 100 in accordance with an exemplary embodiment showing the heat exchanger 300 thermally coupled to the terminal 114. FIG. 8 is a top view of a portion of the charging inlet assembly 100 in accordance with an exemplary embodiment showing the heat exchanger 300 thermally coupled to the terminal 114. FIGS. 5 and 6 illustrate the heat exchanger 300 coupled to the coolant supply line 132 and the coolant return line 134. FIGS. 7 and 8 illustrate the heat exchanger 300 with the coolant supply and return lines 132, 134 removed to illustrate supply and return ends of the heat exchanger 300.

The heat exchanger 300 includes a coolant channel 302 through the heat exchanger 300. Coolant flows through the coolant channel 302 to transfer heat from the heat exchanger 300. The heat exchanger 300 is configured to be thermally coupled to the terminals 114 (for example, directly coupled to the pads 242 or through the power cables 118). The heat exchanger 300 may be pressed against the terminals 114 and/or the power cables 118. For example, the heat exchanger 300 may be secured by fasteners, clips, latches or other securing features.

The heat exchanger 300 includes a heat exchanger body 304 defining the coolant channel 302. The heat exchanger 300 includes a coolant tube 305 extending from the heat exchanger body 304. The coolant tube 305 may be separate and discrete from the heat exchanger body 304 and coupled to the heat exchanger body 304. For example, the coolant tube 305 may be brazed, welded or soldered to the heat exchanger body 304. In an exemplary embodiment, the coolant tube 305 is a U-shaped tube. The coolant tube 305 may have other shapes in alternative embodiments. In an exemplary embodiment, the coolant tube 305 includes a supply tube 306, a return tube 308 and a transition tube 307 between the supply tube 306 and the return tube 308. The transition tube 307 is coupled to the heat exchanger body 304. The supply tube 306 extends from one side of the heat exchanger body 304 and the return tube 308 extends from the opposite side of the heat exchanger body 304. The supply tube 306 extends to the supply port 138 of the cooling adapter 131 (both shown in FIG. 2). The return tube 308 extends to the return port 139 of the cooling adapter 131 (both shown in FIG. 2). In an exemplary embodiment, the coolant tube 305 is continuous from the transition tube 307 to the supply tube 306 and the return tube 308.

The heat exchanger 300 extends between a supply side 310 and a return side 312. The supply tube 306 is provided at the supply side 310 and the return tube 308 is provided at the return side 312. The heat exchanger body 304 includes a front 314 and a rear 316. The front 314 faces the terminals 114. The rear 316 faces the power cables 118. The heat exchanger body 304 includes an end wall 318 extending between the front 314 and the rear 316. The end wall 318 extends along and is configured to be thermally coupled to the terminals 114 and/or the power cables 118. In an exemplary embodiment, the end wall 318 includes a saddle 322 for supporting the terminals 114 and/or the power cables 118. The saddle 322 receives the terminals 114 and/or the power cables 118. In an exemplary embodiment, the saddle 322 (also shown in FIG. 11) includes pockets 324 that receive the terminals 114 and/or the power cables 118. The pockets 324 are sized and shaped to receive the terminals 114 and/or the power cables 118. In the illustrated embodiment, the pockets 324 are sized and shaped to receive the power cables 118. The pockets 324 have a complementary shape as the power cables 118 to securely receive the power cables 118 such that the heat exchanger body 304 is in thermal contact with the power cables 118. For example, the pockets 324 may have a hemicylindrical shape. Other shapes are possible in alternative embodiments, such as a complementary shape as the pads 242 of the terminals 114.

In an exemplary embodiment, the heat exchanger 300 includes a heat exchanger lid 320 coupled to the heat exchanger body 304. The terminals 114 and/or the power cables 118 may be captured between the end wall 318 and the heat exchanger lid 320. The heat exchanger lid 320 may be clipped onto the heat exchanger body 304, such as at the sides 310, 312. The heat exchanger lid 320 may be secured to the heat exchanger body 304 using fasteners, such as at the front 314 and/or the rear 316. When the heat exchanger lid 320 is coupled to the heat exchanger body 304, the power cables 118 are compressed against the heat exchanger body 304 to ensure efficient thermal transfer between the power cables 118 and the heat exchanger body 304.

The heat exchanger body 304 and the heat exchanger lid 320 may be manufactured from thermally conductive materials, such as metal materials. Optionally, both the heat exchanger body 304 and the heat exchanger lid 320 are manufactured form the same material. In various embodiments, the heat exchanger body 304 and/or the heat exchanger lid 320 are manufactured from aluminum or an aluminum alloy. The heat exchanger body 304 and the heat exchanger lid 320 may be stamped and formed. However, the heat exchanger body 304 and the heat exchanger lid 320 may be manufactured by other processes in alternative embodiments, such as being molded, machined, and the like.

The coolant channel 302 is configured for flow communication through the supply tube 306, the transition tube 307, and the return tube 308. The coolant channel 302 is in flow communication with the supply and return lines 132, 134. The coolant is routed through the coolant channel 302 to dissipate heat from the heat exchanger body 304 of the heat exchanger 300 for cooling the terminal 114. In the illustrated embodiment, the coolant tube 305 is U-shaped forming a U-shaped coolant channel 302. The coolant channel 302 may extend along other non-linear paths, such as a curved or serpentine path in alternative embodiments. The coolant channel 302 extends between an inlet 332 at the supply side 310 and an outlet 334 at the return side 312. The supply tube 306 defines the inlet 332 and the return tube 308 defines the outlet 334. In an exemplary embodiment, the coolant tube 305 includes a first bend 336 between the supply tube 306 and the transition tube 307 and a second bend 338 between the transition tube 307 and the return tube 308. The coolant flow directions through the supply tube 306 and the return tube 308 are parallel to the power cables 118 and straight into/out of the supply and return lines 132, 134. The coolant flow direction through the inlet 332 and/or the outlet 334 are parallel to the power cables 118 (for example, straight flow path to/from the coolant supply line 132 and the coolant return line 134). The coolant flow direction through the transition tube 307 is generally perpendicular to the flow through the supply and return tubes 306, 308.

In an exemplary embodiment, the heat exchanger 300 includes a supply fitting 340 coupled to an end 342 of the supply tube 306. The supply fitting 340 may be separate and discrete from the supply tube 306 and coupled thereto. For example, the supply fitting 340 may be threadably coupled to the supply tube 306. In various embodiments, the end 342 of the supply tube 306 may be formed, such as being hydroformed, to include threads (for example, internal threads) for receiving the supply fitting 340. The supply fitting 340 may be coupled by other processes in alternative embodiments, such as being welded or brazed to the end of the supply tube 306. A fluid seal (not shown) may be provided at the interface between the supply tube 306 and the supply fitting 340. In an exemplary embodiment, the heat exchanger 300 includes a supply tube seal 344 proximate to the end 342 of the supply tube 306. The supply tube seal 344 may be positioned between locating features 346 of the supply tube 306. The locating features 346 may be formed, such as by the hydroforming process. The supply tube seal 344 is configured to be sealed against the adapter body 133 of the cooling adapter 131.

In an exemplary embodiment, the supply fitting 340 includes a securing feature 348 for securing the coolant supply line 132 to the supply fitting 340. For example, the securing feature 348 may include a latch or flange forming a circumferential groove around the supply fitting 340. The groove is configured to receive a securing feature of the coolant supply line 132 to secure the coolant supply line 132 to the supply fitting 340. In an exemplary embodiment, the coolant supply line 132 includes a supply line fitting 350 coupled to the supply fitting 340. The supply line fitting 350 may be snappably coupled to the supply fitting 340. For example. the supply line fitting 350 may include a securing feature 352 configured to be coupled to the securing feature 348 of the supply fitting 340. The securing feature 352 may include one or more latches configured to be received in the circumferential groove around the supply fitting 340. Other types of securing features may be provided in alternative embodiments. For example, the fittings 340, 350 may be quick couplers. The fittings 340, 350 may be threadably coupled in alternative embodiments.

In an exemplary embodiment, the heat exchanger 300 includes a return fitting 360 coupled to an end 362 of the return tube 308. The return fitting 360 may be separate and discrete from the return tube 308 and coupled thereto. For example, the return fitting 360 may be threadably coupled to the return tube 308. In various embodiments, the end 362 of the return tube 308 may be formed, such as being hydroformed, to include threads (for example, internal threads) for receiving the return fitting 360. The return fitting 360 may be coupled by other processes in alternative embodiments, such as being welded or brazed to the end of the return tube 308. A fluid seal (not shown) may be provided at the interface between the return tube 308 and the return fitting 360. In an exemplary embodiment, the heat exchanger 300 includes a return tube seal 364 proximate to the end 362 of the return tube 308. The return tube seal 364 may be positioned between locating features 366 of the return tube 308. The locating features 366 may be formed, such as by the hydroforming process. The return tube seal 364 is configured to be sealed against the adapter body 133 of the cooling adapter 131.

In an exemplary embodiment, the return fitting 360 includes a securing feature 368 for securing the coolant return line 134 to the return fitting 360. For example, the securing feature 368 may include a latch or flange forming a circumferential groove around the return fitting 360. The groove is configured to receive a securing feature of the coolant return line 134 to secure the coolant return line 134 to the return fitting 360. In an exemplary embodiment, the coolant return line 134 includes a return line fitting 370 coupled to the return fitting 360. The return line fitting 370 may be snappably coupled to the return fitting 360. For example. the return line fitting 370 may include a securing feature 372 configured to be coupled to the securing feature 368 of the return fitting 360. The securing feature 372 may include one or more latches configured to be received in the circumferential groove around the return fitting 360. Other types of securing features may be provided in alternative embodiments. For example, the fittings 360, 370 may be quick couplers. The fittings 360, 370 may be threadably coupled in alternative embodiments.

Figure 9:
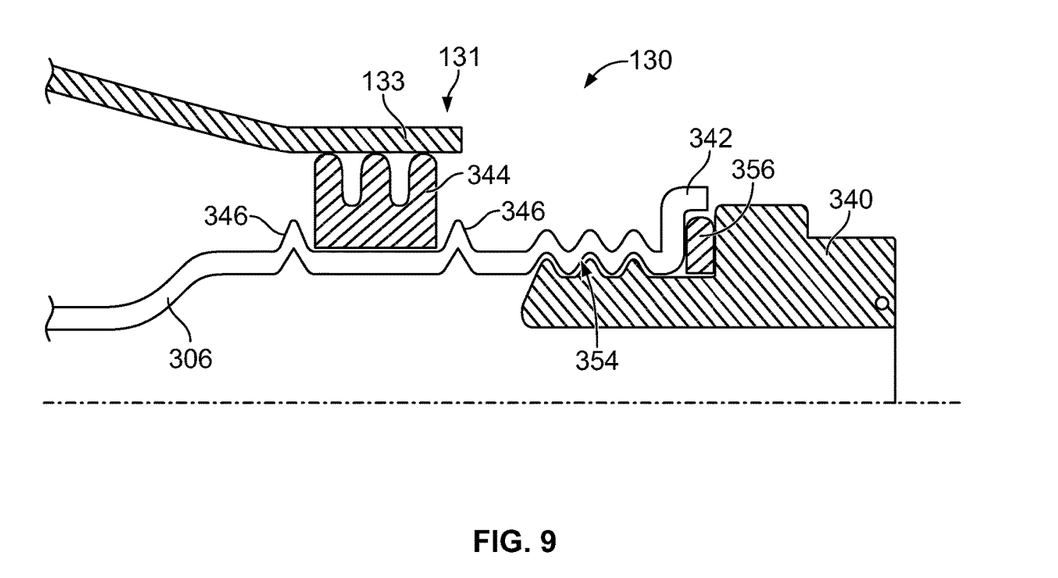
FIG. 9 is a partial sectional view of a portion of the cooling system in accordance with an exemplary embodiment.

FIG. 9 is a partial sectional view of a portion of the cooling system 130 in accordance with an exemplary embodiment showing the supply fitting 340 coupled to the end 342 of the supply tube 306. In the illustrated embodiment, the supply tube 306 is hydroformed to include threads 354 at the end 342. A fluid seal 356 is provided at the end 342. The supply fitting 340 engages the fluid seal 356 and the supply tube 306 to seal the interface between the supply fitting 340 and the supply tube 306. In an exemplary embodiment, the supply tube seal 344 is positioned between the locating features 346 of the supply tube 306 and sealed against the adapter body 133 of the cooling adapter 131.

Figure 10:
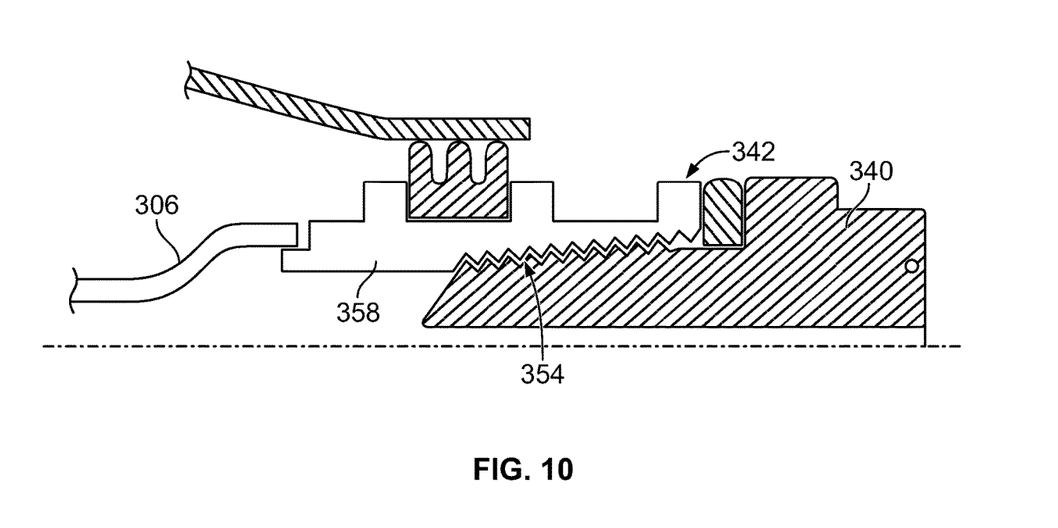
FIG. 10 is a partial sectional view of a portion of the cooling system in accordance with an exemplary embodiment.

FIG. 10 is a partial sectional view of a portion of the cooling system 130 in accordance with an exemplary embodiment showing the supply fitting 340 coupled to the end 342 of the supply tube 306. In an exemplary embodiment, the supply tube 306 includes a ferrule 358 at the end 342. The ferrule 358 may be a machined part having the threads 354 along the interior of the ferrule 358. The supply fitting 340 is configured to be threadably coupled to the ferrule 358 at the end 342 of the supply tube 306. The ferrule 358 may be coupled to the main portion of the supply tube, such as being welded or brazed at a joint.

Figure 11:
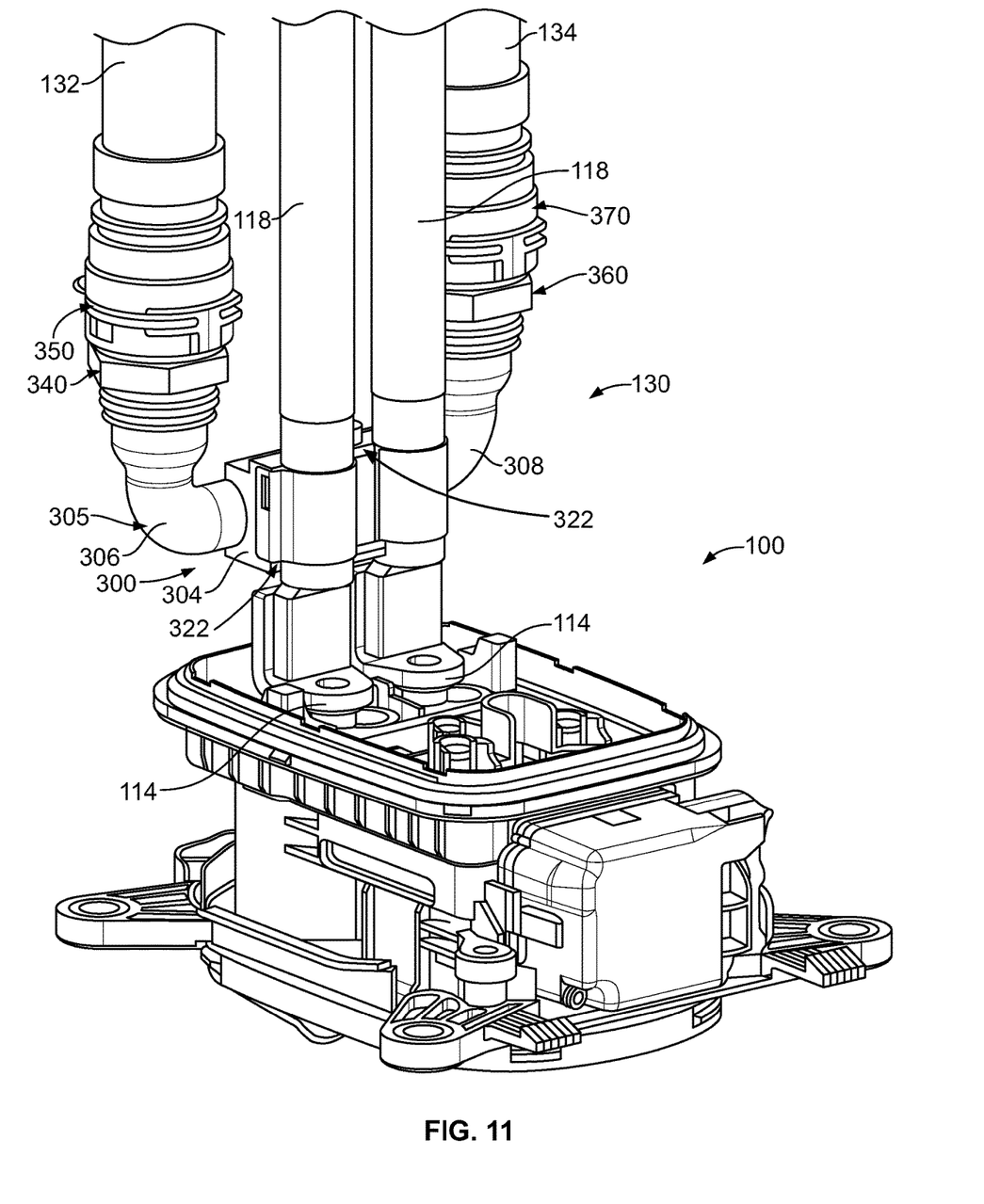
FIG. 11 is a rear perspective view of a portion of the charging inlet assembly in accordance with an exemplary embodiment.
Figure 12:
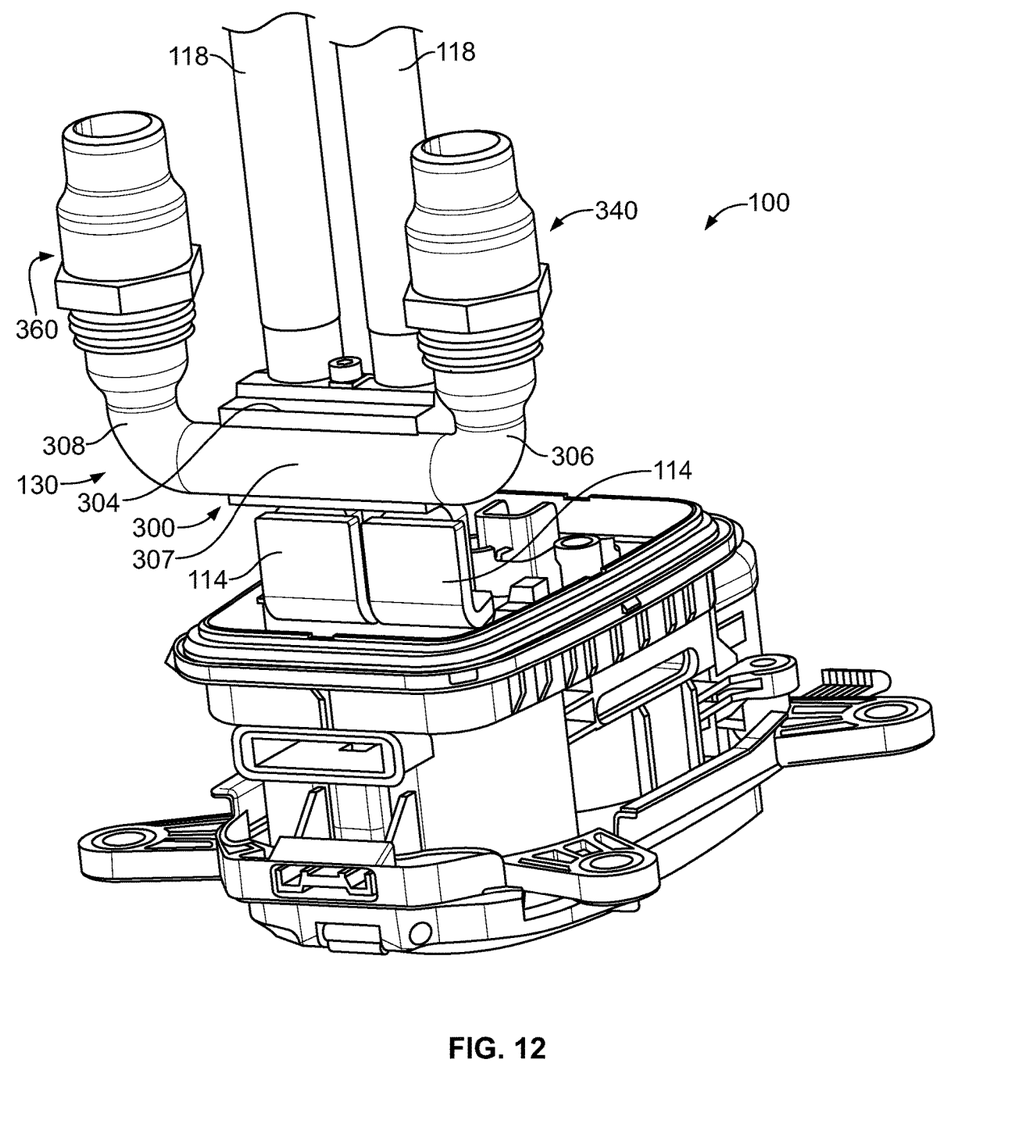
FIG. 12 is another rear perspective view of a portion of the charging inlet assembly in accordance with an exemplary embodiment.

FIG. 11 is a rear perspective view of a portion of the charging inlet assembly 100 in accordance with an exemplary embodiment. FIG. 12 is another rear perspective view of a portion of the charging inlet assembly 100 in accordance with an exemplary embodiment. FIGS. 11 and 12 illustrate the pair of power cables 118 terminated to the pair of terminals 114. FIGS. 11 and 12 illustrate a portion of the cooling system 130 showing the heat exchanger 300 thermally coupled to the terminals 114.

The heat exchanger 300 is coupled to the coolant supply line 132 and the coolant return line 134 (both shown in FIG. 11). The heat exchanger body 304 is thermally coupled to the terminals 114 (such as through the power cables 118) and the coolant tube 305 extends from the heat exchanger body 304 to the coolant supply and return lines 132, 134. For example, the transition tube 307 extends transversely across both power cables 118 and the supply and return tubes 306, 308 are bent (for example, right angle bends) such that the supply and return tubes 306, 308 extend parallel to the power cables 118. The coolant supply and return lines 132, 134 are coupled to the supply and return tubes 306, 308 and continue to extend parallel to the power cables 118. The power cables 118 may be bundled with the coolant supply and return lines 132, 134 and routed together to another location in the vehicle, such as to the battery assembly. With additional reference to FIG. 2, in an exemplary embodiment, the supply tube 306 passes through the supply port 138 such that the supply fitting 340 is provided exterior of the adapter body 133. The supply line fitting 350 is coupled to the supply fitting 340 from outside of the adapter body 133. In an exemplary embodiment, the return tube 308 passes through the return port 139 such that the return fitting 360 is provided exterior of the adapter body 133. The return line fitting 370 is coupled to the return fitting 360 from outside of the adapter body 133.

Figure 13:
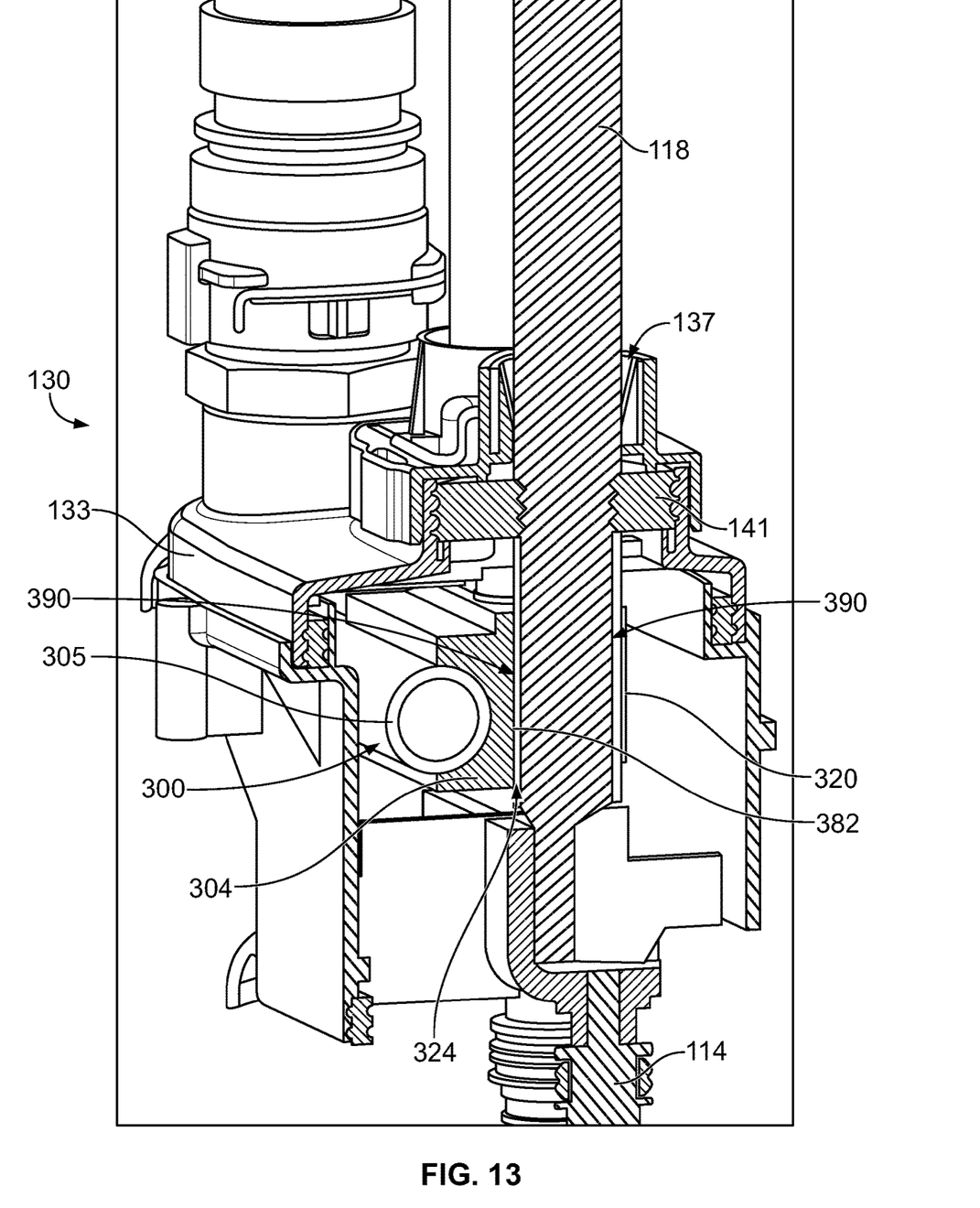
FIG. 13 is a cross sectional view of the cooling system in accordance with an exemplary embodiment showing the heat exchanger thermally coupled to the terminal.

FIG. 13 is a cross sectional view of the cooling system 130 in accordance with an exemplary embodiment showing the heat exchanger 300 thermally coupled to the terminal 114. The power cable 118 passes through the cable exit 137. In an exemplary embodiment, an environmental seal 141 is provided at the cable exit 137 to seal the power cable 118. The environmental seal 141 is sealed against the adapter body 133.

The heat exchanger 300 is used to lower the temperature of the terminal 114 by dissipating heat from the terminal 114, such as through the power cable 118. For example, the heat exchanger 300 is thermally coupled to the power cable 118, which is in turn thermally coupled to the terminal 114. As such, dissipating heat from the power cable 118 reduces the operating temperature of the terminal 114 during charging. In alternative embodiments, the heat exchanger 300 may be directly thermally coupled to the terminal 114 to reduce the operating temperature of the terminal 114.

In an exemplary embodiment, the pocket 324 receives the power cable 118 such that the heat exchanger body 304 is thermally coupled to the power cable 118. The heat exchanger lid 320 holds the power cable 118 tightly in the pocket 324 and presses the power cable 118 against the heat exchanger body 304. The coolant tube 305 passes liquid coolant through the heat exchanger 300 to dissipate heat away from the heat exchanger body 304, and thus reduce the temperature of the power cable 118 and the terminal 114.

In an exemplary embodiment, the heat exchanger 300 includes a thermally conductive separator 390 between the heat exchanger body 304 and the power cable 118. In various embodiments, the thermally conductive separator 390 may be applied to the surface of the pocket 324 and/or the heat exchanger lid 320. In various embodiments, the thermally conductive separator 390 may additionally or alternatively be applied to the power cable 118 or the terminal 114. The thermally conductive separator 390 may be a thermal gasket. The thermally conductive separator 390 may be a silicone tape or film coupled to the terminal 114. In various embodiments, the thermally conductive separator 390 may be an overmolded thin layer on the outer surface 382. The thermally conductive separator 390 may be manufactured from a material that is electrically insulative and highly thermally conductive. The thermally conductive separator 390 may be a thermally conductive epoxy, a thermoplastic material or a thermoset material. The thermally conductive separator 390 may be manufactured from beryllium oxide, aluminum oxide, aluminum nitride, boron nitride, silicone, ceramic, Kapton, nylon, polyester, and the like. The thermally conductive separator 390 may be a pre-formed structure, such as a film, a pad, a sheet, a tube, an injection molded piece, and the like. In other various embodiments, the thermally conductive separator 390 may be applied in situ, such as an overmolded body, a grease or a paste applied to the heat exchanger body 304 or the power cable 118 or the terminal 114. In various embodiments, the thermally conductive separator 390 may be a heat shrink tube applied to the terminal 114. The thermally conductive separator 390 may be manufactured from a doped polymer material, such as a plastic material having thermally conductive materials added to the plastic material to increase the thermal conductivity. Other types of thermally conductive, electrically isolating material may be used in alternative embodiments. In various embodiments, the thermally conductive separator 390 extends for a length of the power cable 118 beyond the heat exchanger body 304 to provide increased creep distance between the power cable 118 and the heat exchanger body 304. The thermally conductive separator 390 may provide double electrical isolation layers between the power cable 118 and the heat exchanger body 304.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A cooling system for a power connector of a charging inlet assembly, the cooling system comprising:
a cooling adapter configured to be coupled to a housing of the charging inlet assembly, the cooling adapter including an adapter body forming a cavity, the adapter body having a cable exit for a power cable of the charging inlet assembly, the cooling adapter including a supply port adjacent the cable exit and a return port adjacent the cable exit;
a heat exchanger positioned in the cavity of the cooling adapter, the heat exchanger configured to receive at least one of the power cable or a terminal extending from the power cable, the heat exchanger being thermally coupled to the at least one of the power cable or the terminal to dissipate heat therefrom, the heat exchanger having a coolant channel for coolant flow through the heat exchanger.

2. The cooling system of claim 1, wherein the heat exchanger includes a coolant tube extending between a coolant supply tube and a coolant return tube, the coolant tube is U-shaped having a transition tube between the supply tube and the return tube, the supply tube being parallel to the return tube.

3. The cooling system of claim 2, wherein the transition tube extends generally perpendicular to the power cable.

4. The cooling system of claim 2, wherein the coolant tube includes a first bend between the supply tube and the transition tube and a second bend between the return to the transition tube.

5. The cooling system of claim 2, wherein the coolant tube is continuous between the supply tube and the return tube passing through the heat exchanger.

6. The cooling system of claim 1, further comprising a second terminal coupled to the housing and a second power cable terminated to the second terminal, the heat exchanger configured to receive at least one of the second power cable or a second terminal, the heat exchanger body being thermally coupled to the at least one of the second power cable or the second terminal to dissipate heat therefrom.

7. The cooling system of claim 6, wherein the heat exchanger includes a heat exchanger body having a first pocket receiving at least one of the power cable or the terminal and a second pocket receiving at least one of the second power cable or the second terminal, the heat exchanger body providing heat dissipation for the terminal and the second terminal.

8. The cooling system of claim 1, wherein the heat exchanger includes a coolant tube having a supply tube at a supply side of the heat exchanger and a return tube at a return side of the heat exchanger, the supply tube extending to the supply port of the cooling adapter, the return tube extending to the return port of the cooling adapter, the cooling system further comprising a supply fitting coupled to an end of the supply tube and a return fitting coupled to an end of the return tube, the supply fitting configured to be coupled to a supply line fitting at an end of the coolant supply line, the return fitting configured to be coupled to a return line fitting at an end of the coolant return line.

9. The cooling system of claim 8, wherein the supply fitting is located exterior of the adapter body and the return fitting is located exterior of the adapter body.

10. The cooling system of claim 8, further comprising a supply tube seal coupled to the supply tube proximate to an end of the supply tube and a return tube seal coupled to the return tube proximate to an end of the return tube, the supply tube seal engaging the adapter body at the supply port to seal the cavity, the return tube seal engaging the adapter body at the return port to seal the cavity.

11. The cooling system of claim 8, wherein the coolant supply line is coupled to the supply tube adjacent the cable exit such that the coolant supply line extends from the adapter body generally parallel to the power cable, the coolant return line being coupled to the return tube adjacent the cable exit such that the coolant supply line extends from the adapter body generally parallel to the power cable.

12. A power connector comprising:
a housing extending between a front and a rear, the housing having a chamber at the rear, the housing having a terminal channel between the front and the rear;
a terminal coupled to the housing having a mating end for mating with a charging connector;
a power cable terminated to the terminal, the power cable including a conductor; and
a cooling system including a cooling adapter and a heat exchanger, the cooling adapter being coupled to the housing, the cooling adapter including an adapter body forming a cavity, the adapter body having a cable exit for the power cable, the cooling adapter including a supply port adjacent the cable exit and a return port adjacent the cable exit, the heat exchanger positioned in the chamber, the heat exchanger including a heat exchanger body receiving at least one of the power cable or of the terminal, the heat exchanger body being thermally coupled to the at least one of the power cable or the terminal to dissipate heat therefrom, the heat exchanger having a coolant channel for coolant flow through the heat exchanger, the heat exchanger including a thermally conductive separator electrically isolating the heat exchanger body from the at least one of the power cable or the terminal.

13. The power connector of claim 12, wherein the heat exchanger includes a coolant tube extending from the heat exchanger body, the coolant tube being thermally coupled to the heat exchanger body, the coolant tube having a coolant channel for coolant flow through the coolant tube, the coolant tube including a supply tube at a supply side of the heat exchanger and a return tube at a return side of the heat exchanger.

14. The power connector of claim 13, wherein the supply tube extends parallel to the power cable and is configured to be coupled to a coolant supply line, and wherein the return tube extends parallel to the power cable and is configured to be coupled to a coolant return line.

15. The power connector of claim 13, wherein the coolant tube is U-shaped having a transition tube between the supply tube and the return tube, the supply tube being parallel to the return tube, the transition tube extends generally perpendicular to the power cable, the supply tube and the return tube extending generally parallel to the power cable.

16. The power connector of claim 13, further comprising a supply fitting coupled to an end of the supply tube and a return fitting coupled to an end of the return tube, the supply fitting configured to be coupled to a supply line fitting at an end of the coolant supply line, the return fitting configured to be coupled to a return line fitting at an end of the coolant return line.

17. The power connector of claim 12, further comprising a second terminal coupled to the housing and a second power cable terminated to the second terminal, the heat exchanger body receiving at least one of the second power cable or the second terminal for heat dissipation of the second terminal.

18. A charging inlet assembly for an electric vehicle comprising:
a housing extending between a front and a rear, the housing having a chamber at the rear, the housing having a power connector at the front for receiving a charging connector, the power connector including a first terminal channel and a second terminal channel between the front and the rear;
a first terminal coupled to the housing, the first terminal positioned in the first terminal channel for mating with the charging connector, the first terminal being terminated to a first power cable;
a second terminal coupled to the housing, the second terminal positioned in the second terminal channel for mating with the charging connector, the second terminal being terminated to a second power cable; and
a heat exchanger positioned in the chamber, the heat exchanger including a heat exchanger body having a first thermal interface being thermally coupled to at least one of the first terminal or the first power cable and having a second thermal interface being thermally coupled to at least one of the second terminal or the second power cable, the heat exchanger including a coolant tube extending from the heat exchanger body, the coolant tube being thermally coupled to the heat exchanger body, the coolant tube having a coolant channel for coolant flow through the coolant tube, the coolant tube including a supply tube at a supply side of the heat exchanger and a return tube at a return side of the heat exchanger.

19. The charging inlet assembly of claim 18, wherein the coolant tube is U-shaped having a transition tube between the supply tube and the return tube, the supply tube and the return tube extending parallel to the first and second power cables, the transition tube extends generally perpendicular to the first and second power cables.

20. The charging inlet assembly of claim 18, wherein the coolant tube is continuous between the supply tube and the return tube passing through the heat exchanger body, the coolant tube including a supply fitting at an end of the supply tube and a return fitting at an end of the return tube, the supply fitting located exterior of the housing and configured to be coupled to a supply line fitting at an end of the coolant supply line, the return fitting located exterior of the housing and configured to be coupled to a return line fitting at an end of the coolant return line.

21. The charging inlet assembly of claim 18, wherein the heat exchanger includes a first thermally conductive separator at the first thermal interface and a second thermally conductive separator at the second thermal interface.

\* \* \* \* \*